United States Patent
Lee et al.

(10) Patent No.: US 8,815,448 B2
(45) Date of Patent: Aug. 26, 2014

(54) NEGATIVE ACTIVE MATERIAL AND LITHIUM BATTERY

(75) Inventors: So-Ra Lee, Yongin-si (KR); Jae-Myung Kim, Yongin-si (KR); Kyu-Nam Joo, Yongin-si (KR); Jong-Hee Lee, Yongin-si (KR); Tae-Sik Kim, Yongin-si (KR); Ui-Song Do, Yongin-si (KR); Young-Su Kim, Yongin-si (KR); Deok-Hyun Kim, Yongin-si (KR); Gu-Hyun Chung, Yongin-si (KR); Beom-Kwon Kim, Yongin-si (KR); Yong-Mi Yu, Yongin-si (KR); Chang-Su Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 176 days.

(21) Appl. No.: 13/016,630

(22) Filed: Jan. 28, 2011

(65) Prior Publication Data

US 2011/0274970 A1 Nov. 10, 2011

(30) Foreign Application Priority Data

May 4, 2010 (KR) ........................ 10-2010-0042063

(51) Int. Cl.
*H01M 4/583* (2010.01)
*H01M 4/133* (2010.01)

(52) U.S. Cl.
USPC ...................................................... 429/231.8

(58) Field of Classification Search
USPC ...................................................... 429/231.8
See application file for complete search history.

(56) References Cited

U.S. PATENT DOCUMENTS

| | | |
|---|---|---|
| 7,071,258 B1 | 7/2006 | Jang et al. |
| 7,285,358 B2 | 10/2007 | Park et al. |
| 7,809,159 B2 | 10/2010 | Ishiyama |
| 2006/0134516 A1 | 6/2006 | Im et al. |
| 2009/0117467 A1 | 5/2009 | Zhamu et al. |
| 2009/0186276 A1 | 7/2009 | Zhamu et al. |
| 2010/0273058 A1 | 10/2010 | Lee et al. |

FOREIGN PATENT DOCUMENTS

KR 10-2003-0032220 A 4/2003

(Continued)

OTHER PUBLICATIONS

Korean Office Action dated Apr. 26, 2012, issued in the Korean Patent Application No. 10-2010-0042063, 6 pages.
Chou, S., et al., *Enhanced reversible lithium storage in a nanosize silicon/graphene composite*, Electrochemistry Communications, vol. 12, No. 2, Dec. 22, 2009, pp. 303-306, XP 26858676.

(Continued)

*Primary Examiner* — Tracy Dove
(74) *Attorney, Agent, or Firm* — Christie, Parker & Hale, LLP (57) ABSTRACT

A negative active material containing super-conductive nanoparticles coated with a high capacity negative material and a lithium battery including the same are provided, wherein the super-conductive nanoparticles have a structure in which polycyclic nano-sheets are stacked upon one another along a direction perpendicular to a first plane. The polycyclic nano-sheets include hexagonal rings of six carbons atoms linked to each other, wherein a first carbon and a second carbon have a distance therebetween of $L_1$. $L_2$ is a distance between a third carbon and a fourth carbon, and the arrangement of the polycyclic nano-sheets is such that $L_1 \geq L_2$. The super-conductive nanoparticle is used as a negative active material in a lithium battery, and the super-conductive nanoparticle increases the capacity, thereby improving the capacity and lifespan of the lithium battery.

20 Claims, 8 Drawing Sheets

(56) References Cited

FOREIGN PATENT DOCUMENTS

| KR | 10-2003-0075800 A | 9/2003 |
| KR | 10-2006-0054475 A | 5/2006 |
| KR | 10-2006-0069738 A | 6/2006 |
| KR | 10-2007-0113066 A | 11/2007 |
| KR | 10-0911433 B1 | 8/2009 |
| KR | 10-2010-0028766 A | 3/2010 |
| WO | WO 2009/061685 A1 | 5/2009 |

OTHER PUBLICATIONS

European Search Report dated Aug. 18, 2011, for corresponding European Patent application 11164156.9, noting listed references in this IDS, 6 pages.

Japanese Office action dated Nov. 27, 2012, for corresponding Japanese Patent application 2011-092909, (2 pages).

EPO Office action dated Feb. 25, 2013, for corresponding European Patent application 11164156.9, (5 pages).

NEGATIVE ACTIVE MATERIAL AND LITHIUM BATTERY

CROSS-REFERENCE TO RELATED APPLICATIONS

This application claims priority to and the benefit of Korean Patent Application No. 10-2010-0042063, filed on May 4, 2010, in the Korean Intellectual Property Office, the entire content of which is incorporated herein by reference.

BACKGROUND

1. Field

One or more embodiments of the present invention relate to a negative active material and a lithium battery including the same.

2. Description of the Related Art

Lithium secondary batteries have drawn attention for use as power sources for small portable electronic devices. Since lithium secondary batteries contain an organic electrolyte, they have a discharge voltage of at least twice that of general batteries containing an aqueous alkali electrolyte, and thus have higher energy density.

Lithium-transition metal oxides, such as $LiCoO_2$, $LiMn_2O_4$, or $LiNi_{1-x}CO_xO_2$ ($0<x<1$), having a structure allowing intercalation of lithium ions, may be used as positive active materials for lithium secondary batteries.

Research has been conducted on carbonaceous materials in various forms, such as artificial graphite, natural graphite and hard carbon, which allow intercalation and deintercalation of lithium ions. In addition, research has been conducted on non-carbonaceous materials such as silicon (Si), for use as negative active materials. Such non-carbonaceous materials exhibit a very high capacitance density that is at least ten times that of graphite. However, the cycle lifespan characteristics thereof deteriorate due to volumetric expansion and shrinkage of lithium during charging and discharging.

SUMMARY

An aspect of an embodiment of the present invention is directed toward a negative active material with high capacity and long lifespan, including a super-conductive nanoparticle coated with a high capacity negative material.

An aspect of an embodiment of the present invention is directed toward a lithium battery including the above negative active material.

Additional aspects will be set forth in part in the description which follows and, in part, will be apparent from the description, or may be learned by practice of the presented embodiments.

According to one or more embodiments of the present invention, there is provided a negative active material including a super-conductive nanoparticle coated with high capacity negative material, wherein the super-conductive nanoparticle has a structure in which n polycyclic nano-sheets are stacked upon one another perpendicular with respect to a first plane, wherein each of the polycyclic nano-sheets includes hexagonal rings of six carbon atoms linked to each other, the hexagonal rings being fused to one another and arranged on the first plane, wherein n is an integer from 2 to 100; and first and second carbons are selected from the n polycyclic nano-sheets of the super-conductive nanoparticle in such a way that $L_1 \geq L_2$, wherein $L_1$ denotes a distance between the first carbon and the second carbon, and $L_2$ denotes a distance between a third carbon and a fourth carbon arbitrarily selected from the n polycyclic nano-sheets, the third and fourth carbons being neither identical to each other nor the same as the first and second carbons; and in a three-dimensional (3D) x, y and z coordinate system, the second carbon is located at B(a, b, c) with respect to the first carbon located at the origin A(0, 0, 0), wherein a and b are each independently about 10 μm or less, (or, 10 μm or less) and c is about 100 nm or less (or, 100 nm or less).

The high capacity negative material may be selected from the group consisting of silicon (Si), nickel (Ni), aluminum (Al), tin (Sn), germanium (Ge), a Si alloy, a Ni alloy, an Al alloy, a Sn alloy, a Ge alloy, a Si oxide, a Ni oxide, an Al oxide, a Sn oxide, a Ge oxide, a Si alloy oxide, a Ni alloy oxide, an Al alloy oxide, a Sn alloy oxide, a Ge alloy oxide and any mixture thereof.

Adjacent carbon atoms in the polycyclic nano-sheets may be linked via a $sp^2$ bond.

Each of the polycyclic nano-sheets may have a thickness in the range of (atomic diameter of carbon)±about 1 nm (or ±1 nm).

N may be an integer from 2 to 10.

C may be in the range of (atomic diameter of carbon×50) ±about 10 nm (or ±10 nm).

C may be in the range of about 0.1 nm to about 50 nm (or, of 0.1 nm to 50 nm).

C may be in the range of about 0.1 nm to about 20 nm (or, of 0.1 nm to 20 nm).

The size of the negative active material may be in the range of about 3 μm to about 60 μm (or, 3 μm to 60 μm).

The negative active material may further include super-conductive nanoparticles that are not coated.

The surface of the negative active material may be pitch-coated.

According to one or more embodiments of the present invention, a lithium battery includes: a positive electrode including a positive active material; a negative electrode including a negative active material including a super-conductive nanoparticle coated with a high capacity negative material; and an electrolyte, wherein the super-conductive nanoparticle has a structure in which n polycyclic nano-sheets are stacked upon one another along a direction perpendicular with respect to a first plane, wherein each of the polycyclic nano-sheets includes hexagonal rings of six carbon atoms linked to each other, the hexagonal rings being fused to one another and arranged on the first plane, wherein n is an integer from 2 to 100; and first and second carbons are selected from the n polycyclic nano-sheets of the super-conductive nanoparticle in such a way that $L_1 \geq L_2$, wherein $L_1$ denotes a distance between the first carbon and the second carbon, and $L_2$ denotes a distance between a third carbon and a fourth carbon arbitrarily selected from the n polycyclic nano-sheets, the third and fourth carbons being neither identical to each other nor the same as the first and second carbons; and in a 3D x, y and z coordinate system, the second carbon is located at B(a, b, c) with respect to the first carbon located at the origin A(0, 0, 0), wherein a and b are each independently about 10 μm or less, (or, 10 μm or less) and c is about 100 nm or less (or, 100 nm or less).

The high capacity negative material may be selected from the group consisting of silicon (Si), nickel (Ni), aluminum (Al), tin (Sn), germanium (Ge), a Si alloy, a Ni alloy, an Al alloy, a Sn alloy, a Ge alloy, a Si oxide, a Ni oxide, an Al oxide, a Sn oxide, a Ge oxide, a Si alloy oxide, a Ni alloy oxide, an Al alloy oxide, a Sn alloy oxide, a Ge alloy oxide and any mixture thereof.

Adjacent carbon atoms in the polycyclic nano-sheets may be linked via a $sp^2$ bond.

Each of the polycyclic nano-sheets may have a thickness in the range of (atomic diameter of carbon)±about 1 nm (or ±1 nm).

N may be an integer from 2 to 10.

C may be in the range of (atomic diameter of carbon×50) ±about 10 nm (or ±10 nm).

C may be in the range of about 0.1 nm to about 50 nm (or, of 0.1 nm to 50 nm).

C may be in the range of about 0.1 nm to about 20 nm (or, of 0.1 nm to 20 nm).

The size of the negative active material may be in the range of about 3 μm to about 60 μm (or, of 3 μm to 60 μm).

The negative active material may further include super-conductive nanoparticles that are not coated.

The surface of the negative active material may be pitch-coated.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Although silicon (Si), tin (Sn), and nickel (Ni)-based active materials have high theoretical capacity, they cannot be practically applied to lithium batteries due to volumetric expansion and precipitation of lithium (Li) during charging and discharging. Thus, in order to use these active materials having high theoretical capacity, there is a need to prevent direct damage to lithium batteries when the volume of these active materials expands.

Generally, it is difficult to cover nano-sized Si with graphite or carbonaceous materials when a Si—C (silicon-carbon) complex material is prepared. Since the specific gravities of Si and C are significantly different, and Si has a relatively large size of 100 nm or greater, Si and the C phase are separated from each other when Si is added to spherical graphite via pores, or when a mixture of Si and graphite are granulated using a granulating device. Thus, it is preferable that Si and C are bound to each other in the initial stage of the formation of the Si—C complex material.

In addition, since degraded Si breaks down into pieces, it is preferable to cover Si with the C phase and support it by a support to sustain a conducting path after Si breaks down.

Embodiments of the present invention will now be described more fully with reference to the accompanying drawings, in which exemplary embodiments of the invention are shown.

A negative active material according to an embodiment of the present invention includes a super-conductive nanoparticle coated with a high capacity negative material.

Figure 1:
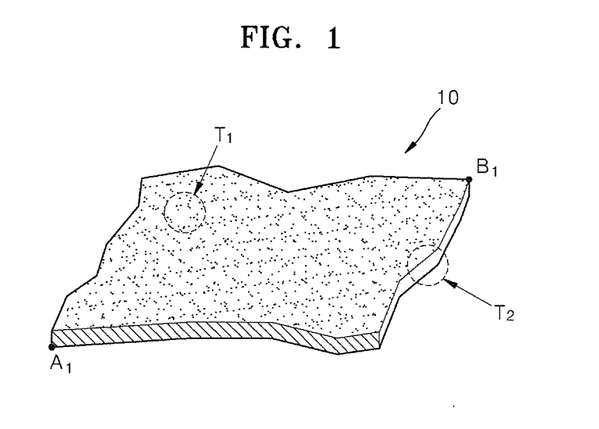
FIG. 1 is a schematic diagram of a super-conductive nano-particle used in an embodiment of the present invention.

FIG. 1 is a schematic diagram of a super-conductive nano-particle 10 used in an embodiment of the present invention.

The super-conductive nanoparticle 10 may have an irregular shape, but generally has a "planar" shape. Nevertheless, the super-conductive nanoparticle 10 may have various suitable shapes, for example, it may be bent or have a rolled end. The "planar" shape of the super-conductive nanoparticle 10 will be more clearly understood based on the description of the super-conductive nanoparticle 10 described below with reference to FIGS. 1 through 4 and FIGS. 9A and 9B.

The super-conductive nanoparticle 10 has a structure in which n polycyclic nano-sheets are stacked upon one another along a direction perpendicular (normal) with respect to a first plane, wherein each of the polycyclic nano-sheets includes hexagonal rings of six carbon atoms linked to each other, the hexagonal rings being fused to one another and arranged on the first plane.

Throughout the specification the wording "a hexagonal ring of six carbon atoms linked to each other" refers to a hexagonal ring including carbon atoms at respective apexes of a hexagon. Hereinafter, this term may also be referred to as a "six-member carbocyclic ring". Each of the polycyclic nano-sheets includes a plurality of six-member carbocyclic rings fused to one another, thereby forming a honeycomb structure having a form of a single layer in which the six-member carbocyclic rings are arranged on the first plane. In this regard, "the arrangement of six-member carbocyclic rings on the first plane" indicates the arrangement and extension of the six-member carbocyclic rings in a lateral direction by fusing, and does not indicate the arrangement and extension thereof in a longitudinal direction. The structure of hexagonal rings of six carbon atoms linked to each other in which the hexagonal rings are fused to one another and arranged on the first plane will be more clearly understood from FIG. 2.

Figure 2:
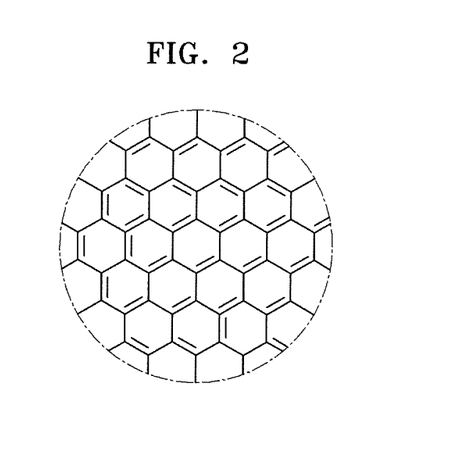
FIG. 2 is a molecular level enlarged schematic diagram of a region $T_1$ delimited by a dashed line in FIG. 1.

FIG. 2 is a molecular level enlarged diagram of a region $T_1$ delimited by a dashed line in FIG. 1. Referring to FIG. 2, the plurality of six-member carbocyclic rings are fused to each other, thereby forming a honeycomb structure having a form of a single layer in which the six-member carbocyclic rings are arranged and extended in a lateral direction without a space therebetween. It is obvious to one of ordinary skill in the art that carbon atoms are positioned at respective apexes of each of the six-member carbocyclic rings.

Adjacent carbon atoms in the polycyclic nano-sheets are linked via an $sp^2$ bond. Thus, a resonance structure is formed in the six-member carbocyclic rings, thereby facilitating migration of electrons.

The polycyclic nano-sheets have a structure in which a plurality of six-member carbocyclic rings are fused to each other and arranged on the first plane. Thus, each of the polycyclic nano-sheets may have, for example, a thickness which is that of the atomic diameter of carbon plus or minus one nanometer ($\pm 1$ nm) or $\pm$about 1 nm. In this regard, the thickness of a polycyclic nano-sheet in the range of the atomic diameter of carbon "plus or minus 1 nm ($\pm 1$ nm)" or "$\pm$about 1 nm" refers to the polycyclic nano-sheet being bent, having a rolled end, and/or being partially broken.

As described above, the super-conductive nanoparticle 10 has a structure in which n polycyclic nano-sheets are stacked upon one another. In this regard, the n polycyclic nano-sheets are stacked upon one another along a direction perpendicular with respect to the first plane on which the plurality of six-member carbocyclic rings, which are fused to each other, are arranged.

Figure 3:
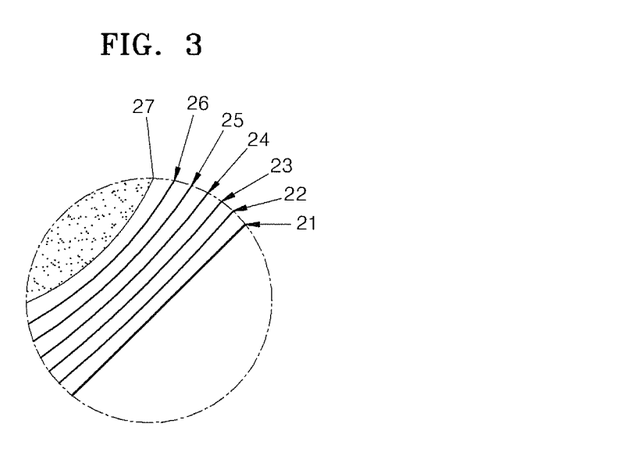
FIG. 3 is an enlarged schematic diagram of a region $T_2$ delimited by a dashed line in FIG. 1.

The above-described structure of the super-conductive nanoparticle 10 will be more clearly understood from FIGS. 2 and 3 showing an enlarged diagram of a region $T_2$ in FIG. 1. The n polycyclic nano-sheets may include a first polycyclic nano-sheet, a second polycyclic nano-sheet, a third polycyclic nano-sheet, . . . , a $(n-2)^{th}$ polycyclic nano-sheet, a $(n-1)^{th}$ polycyclic nano-sheet, and an $n^{th}$ polycyclic nano-sheet stacked upon one another in this order. The embodiment shown in FIG. 1 includes a super-conductive nanoparticle which includes n polycyclic nano-sheets, wherein n=7. Referring to FIG. 3, the super-conductive nanoparticle 10 has a structure in which a first polycyclic nano-sheet 21, a second polycyclic nano-sheet 22, a third polycyclic nano-sheet 23, a fourth polycyclic nano-sheet 24, a fifth polycyclic nano-sheet 25, a sixth polycyclic nano-sheet 26 and a seventh polycyclic nano-sheet 27 are sequentially stacked upon one another. The first polycyclic nano-sheet 21 through the sixth polycyclic nano-sheet 27 are stacked along a direction perpendicular to the first plane on which a plurality of six-member carbocyclic rings are fused to each other and arranged as illustrated in FIG. 2.

In some embodiments, n is an integer from 2 to 100. For example, n may be an integer from 2 to 80, an integer from 2 to 70, an integer from 2 to 40, an integer from 2 to 20, or an integer from 2 to 10.

Assuming that $L_1$ denotes a distance between a first carbon and a second carbon and $L_2$ denotes a distance between a third carbon and a fourth carbon arbitrarily selected from the n polycyclic nano-sheets so that the third and fourth carbons are neither identical to each other nor the same as the first and second carbons, the first and second carbons are selected from the n polycyclic nano-sheets of the super-conductive nanoparticle 10 in such a way that $L_1 \geq L_2$; and in a three dimensional (3D) x, y and z coordinate system, the second carbon is located at B(a, b, c) with respect to the first carbon located at the origin A(0, 0, 0), wherein a and b may be each independently about 10 μm or less, and c may be about 100 nm or less.

The first and second carbons are two carbons with the largest distance therebetween from among all carbons in the n polycyclic nano-sheets.

Figure 4:
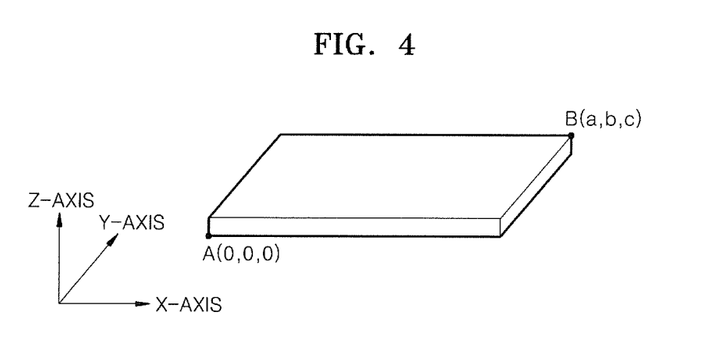
FIG. 4 is a schematic diagram of first and second carbons in a three dimensional (3D) x, y, z coordinate system, wherein the second carbon is located at B(a, b, c) with respect to the first carbon located at the origin A(0,0,0), and the first and second carbons are superimposed on apexes of a virtual hexahedron to show a maximum distance between them.

For example, in the super-conductive nanoparticle 10 of FIG. 1, the first carbon may be located at $A_1$, and the second carbon may be located at $B_1$. FIG. 4 is a schematic diagram of the first and second carbons selected from the polycyclic nano-sheets in a 3D x, y and z coordinate system. The second carbon is located at B(a, b, c) with respect to the first carbon located at the origin A(0, 0, 0), and the first and second carbons are superimposed on apexes of a virtual hexahedron to be described so that a maximum distance is between A and B. Herein, a, b and c correspond to a width, a length, and a height of the virtual hexahedron, respectively, which may be construed as a container in which the super-conductive nanoparticle 10 of FIG. 1 is compactly accommodated.

In this case, a and b may be each independently about 10 μm or less, for example, in a range of about 1 μm to about 10 μm.

In addition, c may be in the range of the atomic diameter of carbon×50 ±about 10 nm (or ±10 nm). In this regard, "atomic diameter of carbon×50", i.e., fifty times the atomic diameter of carbon, refers to the super-conductive nanoparticle 10 includes a maximum number of fifty polycyclic nano-sheets. The "±about 10 nm" or "±10 nm" refers to the super-conductive nanoparticle 10 being bent, having a rolled end, and/or being partially broken.

In particular, c may be about 100 nm or less (or be 100 nm or less). For example, c may be in the range of about 0.1 nm to about 100 nm (or 0.1 nm to 100 nm), about 0.1 nm to about 90 nm (or 0.1 nm to 90 nm), about 0.1 nm to about 50 nm (or 0.1 nm to 50 nm), or about 0.1 nm to about 20 nm (or 0.1 nm to 20 nm), but is not limited thereto.

In one embodiment, if a, b and c of the super-conductive nanoparticle 10 are within the ranges above, although the present embodiments are not limited to any particular principle, a lithium battery including the negative active material has optimal capacity and lifespan.

According to an embodiment of the present invention, a super-conductive nanoparticle powder includes a plurality of super-conductive nanoparticles. Individual super-conductive nanoparticles of the super-conductive nanoparticle powder are described in detail above.

The plurality of super-conductive nanoparticles of the super-conductive nanoparticle powder may have different sizes and shapes. Thus, the super-conductive nanoparticle powder may be defined based on the above description of the super-conductive nanoparticle and a particle size dispersity of the super-conductive nanoparticle powder. For example, each of the super-conductive nanoparticles of the super-conductive nanoparticle powder has dimensions of a, b, and c as defined above, wherein the particle size dispersity of the super-conductive nanoparticle powder may be defined by $d_{50}$ of each of a, b, and c of the super-conductive nanoparticles. The definition of $d_{50}$ is known by one of ordinary skill in the art, and thus a description thereof will not be provided here.

The $d_{50}$ of each of a and b of the super-conductive nanoparticle powder may be independently about 10 μm or less, for example, in the range of about 1 μm to about 10 μm.

The $d_{50}$ of c of the super-conductive nanoparticle powder may be in the range of the atomic diameter of carbon×50±about 10 nm. In this regard, "atomic diameter of carbon×50", i.e., fifty times the atomic diameter of carbon, refers to that each of the super-conductive nanoparticles of the super-conductive nanoparticle powder includes a maximum number of fifty polycyclic nano-sheets. The "±about 10 nm" refers to each of the super-conductive nanoparticles of the super-conductive nanoparticle powder being bent, having a rolled end, and/or being partially broken.

The $d_{50}$ of c of the super-conductive nanoparticle powder may be about 100 nm or less. For example, the $d_{50}$ of c of the super-conductive nanoparticle powder may be in the range of about 0.1 nm to about 100 nm, about 0.1 nm to about 90 nm, about 0.1 nm to about 50 nm, or about 0.1 nm to about 20 nm, but is not limited thereto.

The size of the negative active material may be in the range of about 3 μm to about 60 μm.

In one embodiment, if the size of the negative active material is within the range described above, a lithium battery including the negative active material has optimal lifespan and charge/discharge characteristics, and desired electrode plates can be formed.

According to another embodiment of the present invention, the negative active material may further include super-conductive nanoparticles that are not coated. According to another embodiment, the surface of the negative active material may be pitch-coated.

The super-conductive nanoparticle powder may be prepared using graphite as a starting material. For example, a method of preparing the super-conductive nanoparticle powder may involve expanding graphite, adding a solvent to the expanded graphite and grinding the expanded graphite in the solvent, and removing the solvent from the ground product. The method will now be described in more detail below.

Initially, graphite is heated to expand, followed by removing gas generated during the heating. In this regard, the starting material may be expanded graphite, but is not limited thereto. For example, a heating temperature for expanding the graphite may be in the range of about 400° C. to about 600° C., and a heating time may be in the range of about 30 minutes to about 2 hours, but the heating temperature and time are not limited thereto. In one embodiment, when the heating temperature and the heating time are within these ranges, the binding of carbon atoms are not damaged, and the graphite expands to the extent that "c" of the super-conductive nanoparticle or "$d_{50}$ of c" of the super-conductive nanoparticle powder is within the ranges defined above.

Next, optionally, gas generated when the graphite expands may be removed. The gas may be an oxide generated by a combination of impurities (for example, non-carbonic atoms or molecules) present in the graphite with oxygen. For example, the gas may be $SO_2$, but is not limited thereto. In the heating of the graphite to be expanded, such impurities present in the graphite may be sintered to remove them. Thus, the super-conductive nanoparticle powder has an improved purity.

Next, the solvent is added to the expanded graphite, and then the expanded graphite in the solvent is ground. The solvent may be any solvent that may not substantially react with the expanded graphite and cause the expanded graphite to flow. For example, the solvent is an alcohol, such as ethanol, but is not limited thereto.

Then, the expanded graphite in the solvent is ground in various ways, for example, by using a homogenizer or a microfluidizer. In one embodiment, the grinding may be repeatedly performed several times. For example, the grinding is performed two or more times using a combination of grinding methods. The grinding may be performed in various suitable ways. For example, the expanded graphite may be mixed with an arbitrary acid before being ground. For example, at least one of a and b of the super-conductive nanoparticle may be adjusted by varying the number of grinding processes performed using a microfluidizer, but the present embodiments are not limited thereto.

Next, the solvent is removed to obtain the super-conductive nanoparticle powder. The solvent may be removed in various suitable ways. However, the physical characteristics of the solvent should be considered to select a suitable method. For example, the ground product may be filtered, washed, and then thermally treated at 80° C.

Hereinafter, a method of coating a high capacity negative material on the super-conductive nanoparticle will be described.

The high capacity negative material may be selected from the group consisting of silicon (Si), nickel (Ni), aluminum (Al), tin (Sn), germanium (Ge), Si alloys, Ni alloys, Al alloys, Sn alloys, Ge alloys, Si oxides, Ni oxides, Al oxides, Sn oxides, Ge oxides, Si alloy oxides, Ni alloy oxides, Al alloy oxides, Sn alloy oxides, Ge alloy oxides and mixtures thereof.

When Si, Ni, Al, Sn, Ge, a Si alloy, a Ni alloy, an Al alloy, a Sn alloy, and/or a Ge alloy is coated on the super-conductive nanoparticles, the super-conductive nanoparticles are immersed in a liquid phase halogenated metal and the halogenated metal is reduced.

When a Si oxide, a Ni oxide, an Al oxide, a Sn oxide, a Ge oxide, a Si alloy oxide, a Ni alloy oxide, an Al alloy oxide, a Sn alloy oxide, and/or a Ge alloy oxide is coated on the super-conductive nanoparticles, halogenated metal is reduced and further oxidized in an oxygen atmosphere in the method described above.

The coating may be performed by coating the entire surface of the super-conductive nanoparticle or using an island type coating or a dot type coating.

In one embodiment, the thickness of the coating is in the range of about 1 nm to about 100 nm.

As described above, the high capacity negative material is coated on the super-conductive nanoparticle, and then the resultant is granulated.

The granulation may be performed using a suitable method and a general granulating device.

A lithium battery according to another embodiment of the present invention includes: a positive electrode including a positive active material; a negative electrode including a negative active material including super-conductive nanoparticles coated with a high capacity negative material; and an electrolyte.

The positive electrode may include a current collector and a positive active material layer disposed on the current collector. In one embodiment, a compound (lithiated intercalation compound), which allows reversible intercalation and deintercalation of lithium, is used as the positive active material for forming the positive active material layer. Examples of the positive active material may include compounds represented by the following formulae.

$Li_aA_{1-b}X_bD_2$ (wherein $0.95 \le a \le 1.1$, and $0 \le b \le 0.5$); $Li_aE_{1-b}X_bO_{2-c}D_c$ (wherein $0.95 \le a \le 1.1$, $0 \le b \le 0.5$, and $0 \le c \le 0.05$); $LiE_{2-b}X_bO_{4-c}D_c$ (wherein $0 \le b \le 0.5$, and $0 \le c \le 0.05$); $Li_aNi_{1-b-c}Co_bBcD_\alpha$ (wherein $0.95 \le a \le 1.1$, $0 \le b \le 0.5$, $0 \le c \le 0.05$, and $0 < \alpha \le 2$); $Li_aNi_{1-b-c}Co_bX_cO_{2-\alpha}M_\alpha$ (wherein $0.95 \le a \le 1.1$, $0 \le b \le 0.5$, $0 \le c \le 0.05$, and $0 < \alpha < 2$); $Li_aNi_{1-b-c}CO_bX_cO_{2-\alpha}M_2$ (wherein $0.95 \le a \le 1.1$, $0 \le b \le 0.5$, $0 \le c \le 0.05$, and $0 < \alpha < 2$); $Li_aNi_{1-b-c}Mn_bX_cD_\alpha$ (wherein $0.95 \le a \le 1.1$, $0 \le b \le 0.5$, $0 \le c \le 0.05$, and $0 < \alpha \le 2$); $Li_aNi_{1-b-c}Mn_bX_cO_{2-\alpha}M_\alpha$ (wherein $0.95 \le a \le 1.1$, $0 \le b \le 0.5$, $0 \le c \le 0.05$, and $0 < a < 2$); $Li_aNi_{1-b-c}Mn_bX_cO_{2-\alpha}M_2$ (wherein $0.95 \le a \le 1.1$, $0 \le b \le 0.5$, $0 \le c \le 0.05$, and $0 < a < 2$); $Li_aNi_bE_cG_dO_2$ (wherein $0.90 \le a \le 1.1$, $0 \le b \le 0.9$, $0 \le c \le 0.5$, and $0.001 \le d \le 0.1$); $Li_aNi_bCO_cMn_dG_eO_2$ (wherein $0.90 \le a \le 1.1$, $0 \le b \le 0.9$, $0 \le c \le 0.5$, $0 \le d \le 0.5$, $0 \le e \le 0.1$); $Li_aNiG_bO_2$ (wherein $0.90 \le a \le 1.1$, and $0.001 \le b \le 0.1$); $Li_aCoG_bO_2$ (wherein $0.90 \le a \le 1.1$, and $0.001 \le b \le 0.1$); $Li_aMnG_bO_2$ (wherein $0.90 \le a \le 1.1$, and $0.001 \le b \le 0.1$); $Li_aMn_2G_bO_4$ (wherein 0.90≤a≤1.1, and 0≤b≤0.1); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$. The positive active material may also be a lithium titanate.

In the above formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), rare earth elements, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Co), and combinations thereof, but they are not limited thereto.

For example, the positive active material is a lithium titanate.

Examples of the lithium titanate include a spinel-structured lithium titanate, an anatase-structured lithium titanate, and a ramsdellite-structured lithium titanate, which are classified according to the crystal structure thereof.

The positive active material can be represented by $Li_{4-x}Ti_5O_{12}$ (0≤x≤3). For example, the positive active material is $Li_4Ti_5O_{12}$, but is not limited thereto.

Examples of the positive active material include $Li_aNi_bCO_cMn_dG_eO_2$ (wherein 0.90≤a≤1.1, 0≤b≤0.9, 0≤c≤0.5, 0≤d≤0.5, and e=0, and for example, a=1, b=0.5, c=0.2, d=0.3, and e=0), and $LiMn_2O_4$, but are not limited thereto.

Alternatively, a lithium electrode may be used as the positive electrode. In this case, the positive electrode is referred to as a half cell.

The compounds listed above as positive active materials may have a surface coating layer (hereinafter, "coating layer"). Alternatively, a mixture of a compound not having a coating layer and a compound having a coating layer, the compounds being selected from the compounds listed above, may be used. The coating layer may include at least one compound of a coating element selected from the group consisting of oxides, hydroxides, oxyhydroxides, oxycarbonates, and hydroxycarbonates of the coating element. The compounds for the coating layer may be amorphous or crystalline. The coating element contained in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), and/or any mixtures thereof.

The coating layer may be formed using any method, for example, a spray coating method, a dipping method, and/or the like, which does not adversely affect the physical properties of the positive active material when a compound of such a coating element is used.

In one embodiment, the positive active material layer further includes a binder.

The binder strongly binds positive active material particles together and to a current collector. Examples of the binder include polyimide (PI), polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon, but are not limited thereto.

Al may be used for the current collector, but the present embodiments are not limited thereto.

The positive electrode may be manufactured by coating a positive active material composition, which is prepared by mixing the positive active material and the binder (and an optional conducting agent) in a solvent, on the current collector. Any suitable method of manufacturing the positive electrode may be used. For example, N-methylpyrrolidone can be used as the solvent, but the present embodiments are not limited thereto.

Figure 6A:
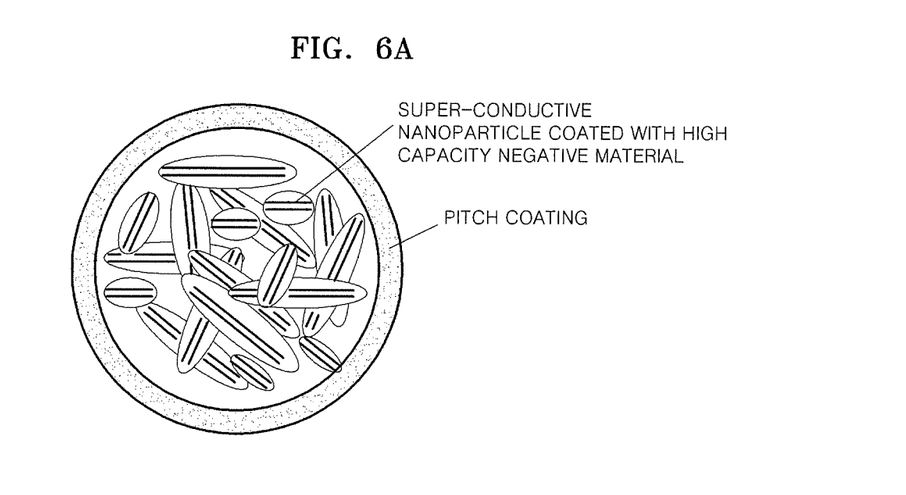
FIG. 6A is a cross-sectional diagram schematically illustrating a negative active material according to an embodiment of the present invention.

FIG. 6A is a cross-sectional diagram schematically illustrating a negative active material according to an embodiment of the present invention;

Referring to FIG. 6A, the negative active material includes a super-conductive nanoparticle coated with a high capacity negative material. The negative active material, the high capacity negative material, and the coating method are described above.

Figure 6B:
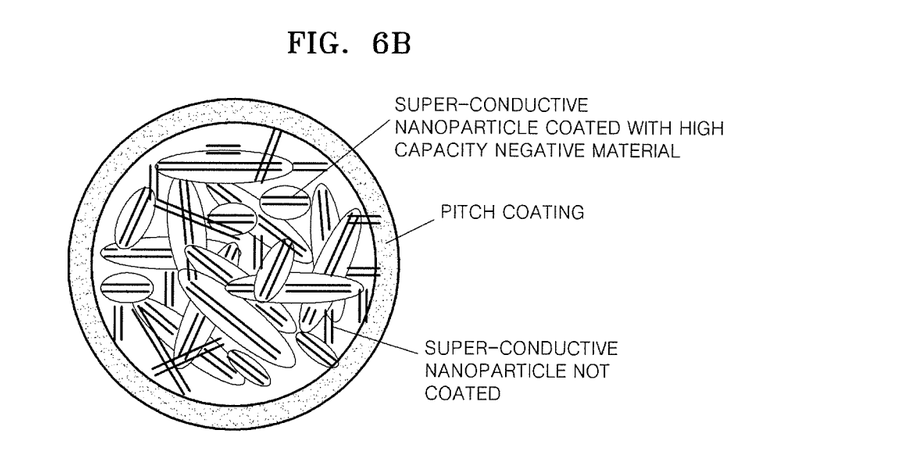
FIG. 6B is a cross-sectional diagram schematically illustrating a negative active material according to another embodiment of the present invention.

FIG. 6B is a cross-sectional diagram schematically illustrating a negative active material according to another embodiment of the present invention;

Referring to FIG. 6B, the negative active material includes a super-conductive nanoparticle coated with a high capacity negative material and a super-conductive nanoparticle that are not coated.

The negative active material as shown in FIG. 6B may be prepared by mixing the super-conductive nanoparticle coated with the high capacity negative material and the super-conductive nanoparticles that are not coated. Alternatively, the negative active material as shown in FIG. 6B may be prepared as a result of detachment of Si from the negative active material shown in FIG. 6A. However, the method of the preparation of the negative active material is not limited thereto.

The negative active material may have a size in the range of about 3 μm to about 60 μm, and the surface of the negative active material may be pitch-coated.

Figure 7:
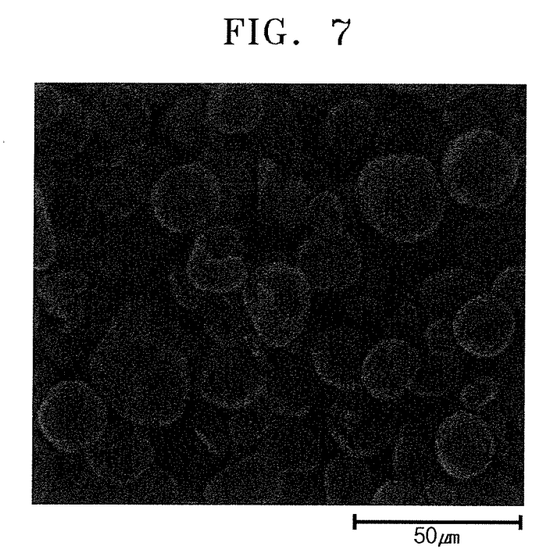
FIG. 7 is an enlarged scanning electron microscopic (SEM) image of a spherical negative active material according to an embodiment of the present invention.

FIG. 7 is an enlarged scanning electron microscopic (SEM) image of a spherical negative active material according to an embodiment of the present invention.

The negative active material may further include a binder and a solvent that are the same as those of the positive active material.

The negative active material may further include a conducting agent. The conducting agent may include at least one material selected from the group consisting of carbon black, ketchen black, acetylene black, artificial graphite, natural graphite, copper powder, nickel powder, aluminum powder, silver powder, polyphenylene, and combinations thereof. If required, a plasticizer may be further added to each of the positive active material composition and the negative active material composition to form pores in the electrode plates.

The electrolyte may include a nonaqueous organic solvent and a lithium salt.

The nonaqueous organic solvent may function as a migration medium of ions involved in electrochemical reactions in batteries.

Examples of the nonaqueous organic solvent may include carbonates, esters, ethers, ketones, alcohols, and aprotic solvents. Examples of the carbonates available as the nonaqueous organic solvent may include dimethyl carbonate (DMC), diethyl carbonate (DEC), dipropyl carbonate (DPC), methylpropyl carbonate (MPC), ethylpropyl carbonate (EPC), ethyl methyl carbonate (EMC), ethylene carbonate (EC), propylene carbonate (PC), and butylene carbonate (BC). Examples of the esters available as the nonaqueous organic solvents may include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ethers available as the nonaqueous organic solvent may include dibutyl ether, tetraglyme, diglyme, dimethoxyethane, 2-methyl-tetrahydrofuran, and tetrahydrofuran. An example of the ketones available as the nonaqueous organic solvent may be cyclohexanone. Examples of the alcohols available as the nonaqueous organic solvent may include ethyl alcohol, isopropyl alcohol, and the like. Examples of the aprotic solvents may include nitrils, such as R—CN (wherein R is a straight, branched or cyclic C2-C20 hydrocarbon group, which may have a double-bonded aromatic ring or an ether bond); amides, such as dimethylformamide; dioxolanes, such as 1,3-dioxolane; and sulfolanes.

The nonaqueous organic solvent may be used alone. Alternatively, at least two of the nonaqueous organic solvents may be used in combination. In this case, a mixing ratio of the at least two nonaqueous organic solvents may appropriately vary according to the performance of the battery.

The lithium salt is dissolved in the organic solvent and functions as a source of lithium ions in the battery, enabling the basic operation of the lithium battery. In addition, the lithium salt facilitates the migration of lithium ions between the positive electrode and the negative electrode. Examples of the lithium salt may include at least one supporting electrolyte salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, $LiB(C_2O_4)_2$ (LiBOB; lithium bis(oxalato) borate), and combinations thereof. The concentration of the lithium salt may be in the range of about 0.1 to about 2.0 M. When the concentration of the lithium salt is within this range, the electrolyte may have an appropriate conductivity and viscosity, and thus may exhibit excellent performance, allowing lithium ions to effectively migrate.

A separator may be disposed between the positive electrode and the negative electrode according to the type of the lithium battery. The separator may be a monolayer or a multilayer including at least two layers formed of polyethylene, polypropylene, and/or polyvinylidene fluoride. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

Lithium batteries may be classified into lithium ion batteries, lithium ion polymer batteries, and lithium polymer batteries according to the types of a separator and electrolyte. In addition, lithium batteries may be classified into a cylindrical type, a rectangular type, a coin type, and a pouch type according to the battery shape, and may also be classified into a bulk type and a thin film type according to the battery size. Lithium batteries may be used either as primary lithium batteries or secondary lithium batteries. Here, any suitable method may be utilized to manufacture a lithium battery.

Figure 5:
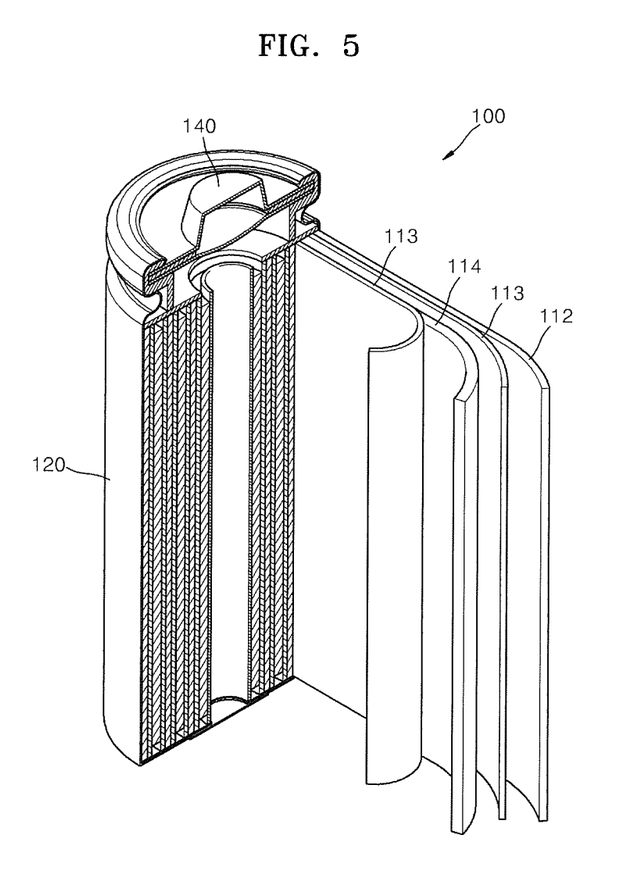
FIG. 5 is an exploded perspective view of a lithium battery according to an embodiment of the present invention.

FIG. 5 is an exploded perspective view of a lithium battery 100 according to an embodiment of the present invention. Referring to FIG. 5, the lithium battery 100 according to the present embodiment includes a positive electrode 114, a negative electrode 112, a separator 113 disposed between the positive electrode 114 and the negative electrode 112, an electrolyte impregnated into the positive electrode 114, the negative electrode 112 and the separator 113, a battery case 120, and a sealing member 140 for sealing the battery case 120. The lithium battery 100 of FIG. 5 is manufactured by sequentially stacking the positive electrode 114, the negative electrode 112 and the separator 113 to form a stack, winding the stack in a spiral form, and accommodating the wound stack in the battery case 120.

EXAMPLES

Preparation Example 1

100 g of expanded graphite was heated at 500° C. for 1 hour to expand, and a gas generated during the heating was exhausted through a ventilation hole to obtain an expanded graphite product. The expanded graphite product was dispersed in ethanol and ground using a homogenizer at 10,000 rpm for 10 minutes to obtain a ground mixture. The ground mixture was further ground using a microfluidizer, filtered using filtering equipment, washed with ethanol, and dried in an oven at 120° C. to obtain super-conductive nanoparticle powder.

Figure 9A:
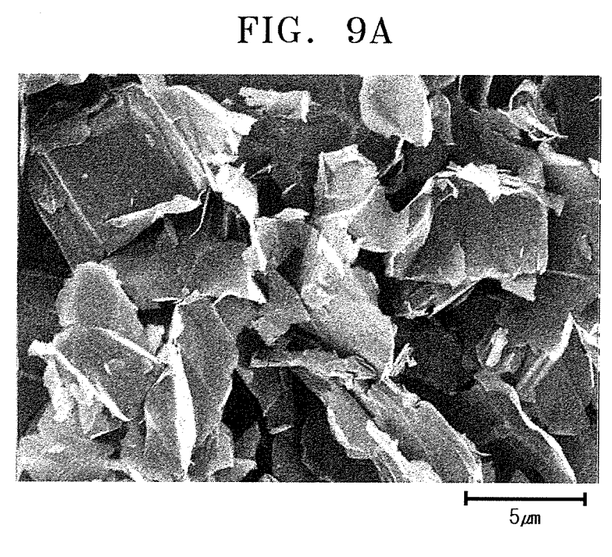
FIG. 9A is a SEM image of a super-conductive nanoparticle powder prepared according to Preparation Example 1.

FIG. 9A is a SEM image of a super-conductive nanoparticle powder prepared according to Preparation Example 1. Referring to FIG. 9A, it was identified that individual super-conductive nanoparticles of the super-conductive nanoparticle powder basically had planar shapes.

Figure 9B:
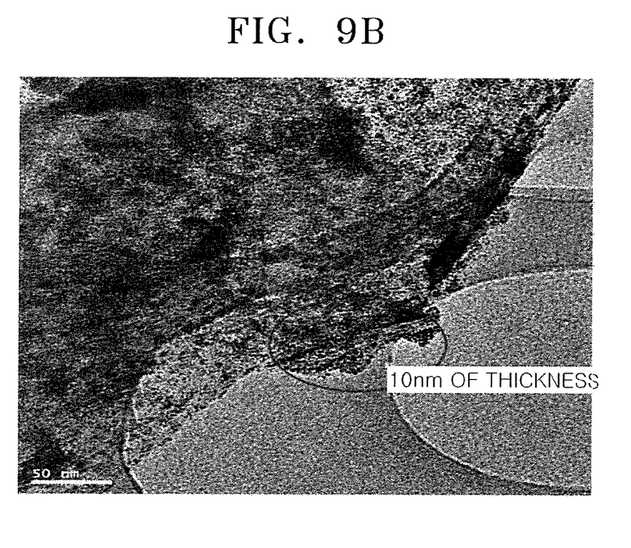
FIG. 9B is a transmission electron microscopic (TEM) image of the super-conductive nanoparticle of Preparation Example 1.

FIG. 9B is a transmission electron microscopic (TEM) image of the super-conductive nanoparticle of Preparation Example 1. Referring to FIG. 9B, a region delimited by a dashed circle corresponds to the region $T_2$ in FIG. 1, and the super-conductive nanoparticles had a thickness of about 10 nm. As identified in FIG. 9B, the super-conductive nanoparticles of the super-conductive nanoparticle powder prepared as described above had a "c" of about 10 nm, wherein "c" is defined above in connection with FIGS. 1 and 4.

Figure 10:
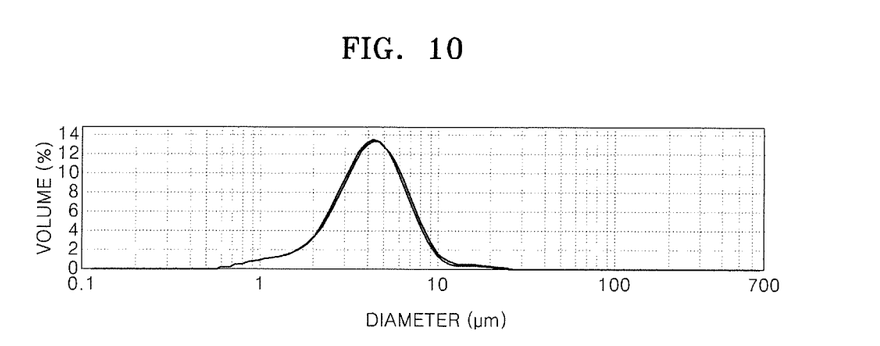
FIG. 10 is a graph of particle size dispersity of the super-conductive nanoparticle powder of Preparation Example 1.

In addition, a particle size dispersity of the super-conductive nanoparticles of the super-conductive nanoparticle powder was measured using a Hydro2000 (Malvern Instruments Ltd.). The results are shown in FIG. 10. Referring to FIG. 10, $d_{10}$, $d_{50}$ and $d_{90}$ of "a" or "b" of the super-conductive nanoparticles of the super-conductive nanoparticle powder were 2.1 μm, 4.11 μm and 7.16 μm, respectively, wherein "a" and "b" are defined above in connection with FIGS. 1 and 4.

Example 1

The super-conductive nanoparticle powder prepared according to Preparation Example 1 was immersed in a liquid phase $SiCl_4$, and dried and annealed at 300° C. This process was repeated two or more times. The phase of the resultant was stabilized by sintering the resultant at 600° C. The resultant was washed and dried three times to coat Si on the super-conductive nanoparticle powder to a thickness in the range of about 1 to about 10 nm. After the coating, the super-conductive nanoparticle powder is granulated using a granulating device to a $d_{50}$ of 15 μm to prepare a negative active material.

A negative active material slurry was prepared by dissolving the negative active material coated with Si, Pl as a binder, and denka black as a conducting agent at a weight ratio of 80:10:10 in N-methylpyrrolidone.

The negative active material slurry was coated on an aluminum (Al)-foil to form a thin negative electrode plate having a thickness of 90 μm, dried at 135° C. for 3 hours or longer, and pressed to a thickness 70 μm. The resulting negative electrode plate was punched into a circular piece having a size of 13ϕ, and a weight thereof was recorded. The circular piece was used to form a negative electrode having a shape suitable for welding, and a weight of the negative electrode was recorded. The resultant negative electrode was welded to a bottom of a 2032 coin cell and placed in an evacuated vacuum oven at 250° C. for 5 hours.

Li was used as a positive electrode of the coin cell.

Next, the negative electrode, the positive electrode, a polyethylene separator having a thickness of 20 μm, and an electrolyte (containing a mixture of ethylene carbonate (EC) and ethylmethyl carbonate (EMC) at a volume ratio of 3:7 and 1.3 M LiPF$_6$) were assembled to manufacture a lithium battery.

The granulated negative active material according to Example 1 is shown in FIG. 7.

Comparative Example 1

The super-conductive nanoparticle powder prepared according to Preparation Example 1 and Si having a d$_{50}$ of 300 nm were mixed at a weight ratio of 80:20, and the mixture was granulized using a granulating device to have a d$_{50}$ of 15 μm to prepare a negative active material.

A lithium battery was prepared in the same manner as in Example 1, except that the negative active material was used.

Figure 8:
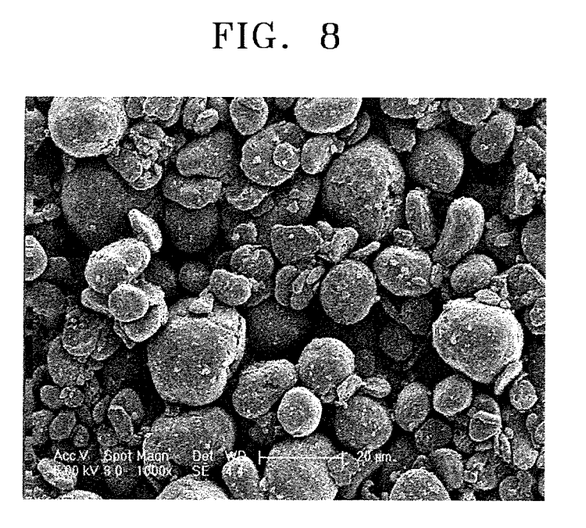
FIG. 8 is an enlarged SEM image of a spherical negative active material according to Comparative Example 1.

The granulated negative active material according to Preparation Example 1 is shown in FIG. 8.

Comparative Example 2

The super-conductive nanoparticle powder prepared according to Preparation Example 1 was granulated using a granulating device to a d$_{50}$ of 15 μm. A negative active material slurry was prepared by dissolving the granulated super-conductive nanoparticles, Si having a d$_{50}$ of 300 nm, Pl as a binder, and denka black as a conducting agent at a weight ratio of 64:16:10:10 in N-methylpyrrolidone.

A lithium battery was prepared in the same manner as in Example 1, except that the negative active material was used.

Evaluation Example

A formation process was performed by keeping the lithium batteries of Example 1 and Comparative Examples 1 and 2 at room temperature (25° C.) for 20 hours.

Changes in capacities of the lithium batteries of Example 1 and Comparative Examples 1 and 2 that underwent the formation process were measured during 50 or more cycles of charging and discharging at a charge/discharge rate of 0.2 C. Herein, the charging was performed at a constant current-constant voltage (CC-CV) of 0.01 V under a cut-off current of 0.01 C, and the discharging was performed at a current rate of 0.2 C under a cut-off voltage of 1.1 V. The results are shown in FIGS. 11 and 12.

Figure 11:
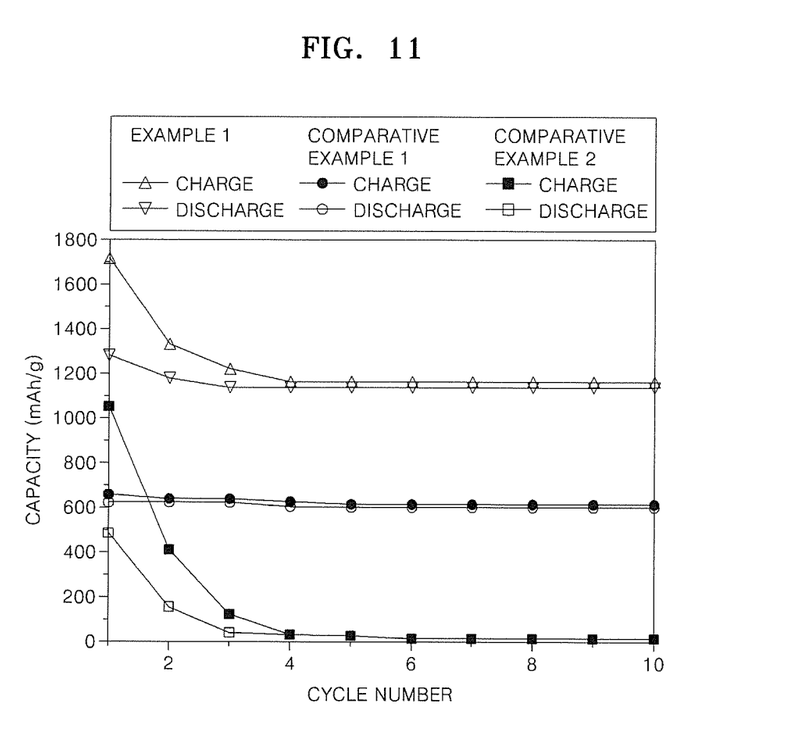
FIG. 11 is a graph illustrating the capacitance characteristics of lithium batteries manufactured according to Example 1 and Comparative Examples 1 and 2.

Referring to FIG. 11, the lithium battery prepared according to Example 1 had better capacity without reduction in capacity during the cycles of charging and discharging than the lithium batteries prepared according to Comparative Examples 1 and 2.

Figure 12:
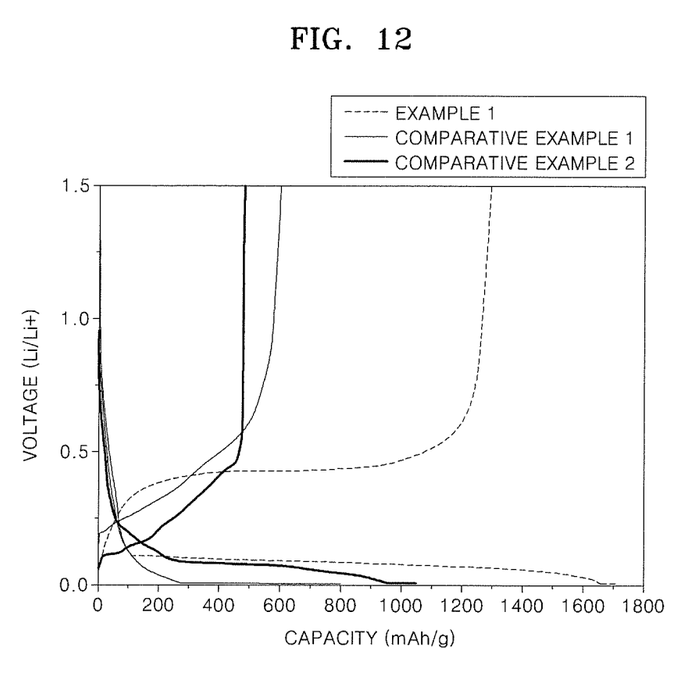
FIG. 12 is a graph illustrating charge/discharge characteristics of the lithium batteries of Example 1 and Comparative Examples 1 and 2.

Referring to FIG. 12, the lithium battery prepared according to Example 1 had better capacity and similar charge and discharge capability when compared to the lithium batteries prepared according to Comparative Examples 1 and 2.

As described above, the lithium battery according to one or more of the above embodiments of the present invention includes a granulated negative active material including super-conductive nanoparticles coated with a high capacity negative material. The lithium battery has excellent capacity and efficiency and may be efficiently manufactured. The negative active material including the super-conductive nanoparticles has excellent operational stability.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A negative active material comprising a super-conductive nanoparticle coated with a high capacity negative material, wherein:
   the super-conductive nanoparticle has a structure in which n polycyclic nano-sheets are stacked upon one another along a direction perpendicular with respect to a first plane,
   each of the polycyclic nano-sheets comprises hexagonal rings of six carbon atoms linked to each other, the hexagonal rings being fused to one another and arranged in a lateral plane,
   n is an integer from 2 to 100,
   first and second carbons are selected from the n polycyclic nano-sheets of the super-conductive nanoparticle in such a way that $L_1 \geq L_2$, the first carbon and the second carbon being two carbons with the largest distance therebetween from among all carbons in the n polycyclic nano-sheets,
   $L_1$ denotes a distance between the first carbon and the second carbon,
   $L_2$ denotes a distance between a third carbon and a fourth carbon selected from the n polycyclic nano-sheets, the third and fourth carbons being neither identical to each other nor the same as the first and second carbons,
   in a three dimensional (3D) x, y and z coordinate system, the second carbon is located at B(a, b, c) with respect to the first carbon located at the origin A(0, 0, 0),
   a and b are each independently about 10 μm or less, and
   c is about 100 nm or less,
   wherein the size of the negative active material, comprising the super-conductive nanoparticle coated with the high capacity negative active material., is in a range of about 3 μm to about 60 μm.

2. The negative active material of claim 1, wherein the high capacity negative material is selected from the group consisting of silicon (Si), nickel (Ni), aluminum (Al), tin (Sn), germanium (Ge), Si alloys, Ni alloys, Al alloys, Sn alloys, Ge alloys, Si oxides, Ni oxides, Al oxides, Sn oxides, Ge oxides, Si alloy oxides, Ni alloy oxides, Al alloy oxides, Sn alloy oxides, Ge alloy oxides and mixtures thereof.

3. The negative active material of claim 1, wherein adjacent carbon atoms in the polycyclic nano-sheets are linked via a sp$^2$ bond.

4. The negative active material of claim 1, wherein each of the polycyclic nano-sheets has a thickness in a range of the atomic diameter of carbon ±about 1 nm.

5. The negative active material of claim 1, wherein n is an integer from 2 to 10.

6. The negative active material of claim 1, wherein c is in a range of the atomic diameter of carbon ×50±about 10 nm.

7. The negative active material of claim 1, wherein c is in a range of about 0.1 nm to about 50 nm.

8. The negative active material of claim 1, wherein c is in a range of about 0.1 nm to about 20 nm.

9. The negative active material of claim 1, further comprising uncoated super-conductive nanoparticles.

10. The negative active material of claim 1, wherein a surface of the negative active material is pitch-coated.

11. A lithium battery comprising:
a positive electrode comprising a positive active material;
a negative electrode comprising a negative active material comprising a super-conductive nanoparticle coated with a high capacity negative material; and
an electrolyte, wherein:
the super-conductive nanoparticle has a structure in which n polycyclic nano-sheets are stacked upon one another along a direction perpendicular with respect to a first plane,
each of the polycyclic nano-sheets comprises hexagonal rings of six carbon atoms linked to each other, the hexagonal rings being fused to one another and arranged in a lateral plane,
n is an integer from 2 to 100,
first and second carbons are selected from the n polycyclic nano-sheets of the super-conductive nanoparticle in such a way that $L_1 \geq L_2$, the first carbon and the second carbon being two carbons with the largest distance therebetween from among all carbons in the n polycyclic nano-sheets,
$L_1$ denotes a distance between the first carbon and the second carbon,
$L_2$ denotes a distance between a third carbon and a fourth carbon selected from the n polycyclic nano-sheets, the third and fourth carbons being neither identical to each other nor the same as the first and second carbons,
in a 3D x, y and z coordinate system, the second carbon is located at B(a, b, c) with respect to the first carbon located at the origin A(0, 0, 0),
a and b are each independently about 10 μm or less, and
c is about 100 nm or less,
wherein the size of the negative active material, comprising the super-conductive nanoparticle coated with the high capacity negative active material, is in a range of about 3 μm to about 60 μm.

12. The lithium battery of claim 11, wherein the high capacity negative material is selected from the group consisting of silicon (Si), nickel (Ni), aluminum (Al), tin (Sn), germanium (Ge), Si alloys, Ni alloys, Al alloys, Sn alloys, Ge alloys, Si oxides, Ni oxides, Al oxides, Sn oxides, Ge oxides, Si alloy oxides, Ni alloy oxides, Al alloy oxides, Sn alloy oxides, Ge alloy oxides and mixtures thereof.

13. The lithium battery of claim 11, wherein adjacent carbon atoms in the polycyclic nano-sheets are linked via a $sp^2$ bond.

14. The lithium battery of claim 11, wherein each of the polycyclic nano-sheets has a thickness in a range of the atomic diameter of carbon ±about 1 nm.

15. The lithium battery of claim 11, wherein n is an integer from 2 to 10.

16. The lithium battery of claim 11, wherein c is in a range of the atomic diameter of carbon×50±about 10 nm.

17. The lithium battery of claim 11, wherein c is in a range of about 0.1 nm to about 50 nm.

18. The lithium battery of claim 11, wherein c is in a range of about 0.1 nm to about 20 nm.

19. The lithium battery of claim 11, wherein the negative active material further comprises uncoated super-conductive nanoparticles.

20. The lithium battery of claim 11, wherein a surface of the negative active material is pitch-coated.

* * * * *